US009332252B2

(12) United States Patent
Silva

(10) Patent No.: US 9,332,252 B2
(45) Date of Patent: May 3, 2016

(54) AUTOMATIC TEST SYSTEM FOR DIGITAL DISPLAY SYSTEMS

(75) Inventor: Antonio Silva, Samarate (IT)

(73) Assignee: AGUSTA WESTLAND S.P.A., Samarate (IT)

( * ) Notice: Subject to any disclaimer, the term of this patent is extended or adjusted under 35 U.S.C. 154(b) by 825 days.

(21) Appl. No.: 13/438,280

(22) Filed: Apr. 3, 2012

(65) Prior Publication Data

US 2012/0254664 A1   Oct. 4, 2012

(30) Foreign Application Priority Data

Apr. 4, 2011 (EP) .................................... 11425088

(51) Int. Cl.
*G06F 11/28* (2006.01)
*H04N 17/04* (2006.01)
*H04N 17/00* (2006.01)

(52) U.S. Cl.
CPC ........... *H04N 17/045* (2013.01); *H04N 17/004* (2013.01)

(58) Field of Classification Search
USPC .................................................. 345/204, 3.1
See application file for complete search history.

(56) References Cited

U.S. PATENT DOCUMENTS

| | | | | |
|---|---|---|---|---|
| 4,833,625 A * | 5/1989 | Fisher et al. | .................. | 345/668 |
| 4,907,181 A | 3/1990 | Hedtke et al. | | |
| 7,752,026 B2 * | 7/2010 | Gabele et al. | .................. | 703/16 |
| 7,808,448 B1 * | 10/2010 | Dotson | ........................... | 345/1.3 |
| 7,900,044 B2 * | 3/2011 | McCreight et al. | ........... | 713/168 |
| 8,620,093 B2 * | 12/2013 | Nguyen | ............... | G06K 9/6244 |
| | | | | 382/218 |
| 8,683,503 B2 * | 3/2014 | Deng | ............................... | 725/19 |
| 2005/0071108 A1 | 3/2005 | Kulidjian et al. | | |
| 2006/0153296 A1 | 7/2006 | Deng | | |
| 2006/0262191 A1 | 11/2006 | Straney et al. | | |
| 2009/0179745 A1 * | 7/2009 | Okamoto et al. | .......... | 340/425.5 |
| 2010/0269147 A1 * | 10/2010 | Zetterower | ............. | H04N 5/782 |
| | | | | 725/114 |
| 2010/0283858 A1 * | 11/2010 | Katchan | ................ | G06F 11/221 |
| | | | | 348/189 |
| 2010/0289918 A1 * | 11/2010 | Yoshizaki | .............. | H04N 1/603 |
| | | | | 348/223.1 |
| 2012/0098864 A1 * | 4/2012 | Chowdhry et al. | ........... | 345/660 |
| 2013/0093922 A1 * | 4/2013 | Mowry | ........................ | 348/239 |

FOREIGN PATENT DOCUMENTS

| | | | |
|---|---|---|---|
| CN | 101594551 A | * | 5/2008 |
| CN | 101594551 | | 12/2009 |
| EP | 1727376 | | 11/2006 |

(Continued)

*Primary Examiner* — Kate Luo
(74) *Attorney, Agent, or Firm* — Leason Ellis LLP

(57) ABSTRACT

The present invention relates to an automatic test system for a digital display system, which digital display system comprises display electronics configured to output a digital video stream, and a display screen connected to the display electronics to receive the digital video stream generated thereby and to display at least one image based on the received digital video stream. The automatic test system is designed to be connected to the digital display system to receive the digital video stream generated by the display electronics, and is configured to: reconstruct in memory an image based on the received digital video stream; compute a signature of the reconstructed-in-memory image; and test the digital display system by comparing the computed signature with a reference signature so as to thereby check whether the reconstructed-in-memory image completely matches an expected good display behavior, wherein said reference signature is indicative of said expected good display behavior.

10 Claims, 1 Drawing Sheet

(56) References Cited

FOREIGN PATENT DOCUMENTS

| | | |
|---|---|---|
| JP | S64-008560 | 1/1989 |
| JP | 2118689 | 5/1990 |
| JP | H02118689 | 5/1990 |
| JP | 2006333465 | 12/2006 |
| JP | 2007288634 | 11/2007 |
| WO | WO 2007/022250 | 2/2007 |

\* cited by examiner

AUTOMATIC TEST SYSTEM FOR DIGITAL DISPLAY SYSTEMS

CROSS-REFERENCE TO RELATED APPLICATION

This application is based on and claims priority under 35 U.S.C. §119 from European Patent Application No. 11425088.9 filed Apr. 4, 2011, which is hereby incorporated by reference in its entirety.

TECHNICAL FIELD

The present invention relates to an automatic test system for digital display systems. In particular, the present invention may be advantageously used to automatically test digital display systems used, for example, in the aircraft, railway, automotive, nuclear and biomedical industries.

BACKGROUND ART

As is known, the efficiency of many critical systems used, for example, in aircraft, trains, motor vehicles, nuclear plants, biomedical equipment, etc., depends on sophisticated graphic human-machine interfaces (HMIs) of digital display systems. To improve the efficiency of HMIs and make them easier to use, increasingly complex, flexible, high-power digital display systems have been devised over the past few years, thus resulting in an enormous increase in the amount of testing required to ensure an adequate degree of dependability, and which may run to as many as hundreds of thousands of tests.

At present, many electronic systems are tested on computer-aided test benches programmed to simulate the system's operating environment, and automatically real-time or offline test system performance to detect any malfunctions.

Despite the advantages of bench testing, only digital display system input/output signals are currently tested automatically, while, using scripts to set system operating scenarios, the display performance of digital display systems is still mostly tested by human operators monitoring the system's screen.

Human-operator testing display performance is seriously complicated when dealing with leading-edge systems, in which digital display systems are graphic servers designed to execute high-level graphic commands and receive numerous commands simultaneously from different client computers. Systems of this sort call for testing both individual digital display systems and computers, as well as operation of the integrated system as a whole, which, as stated, may involve testing hundreds of thousands of graphic images.

In recent years, to automate display performance testing of digital display systems, it has been proposed to take pictures of digital display system screens using digital cameras, and compare the pictures with reference images to reveal any display anomalies. Testing this way, however, has proved unsatisfactory, owing to the wide tolerance range of currently used digital camera sensors, which are also affected by surrounding light and result in a high percentage of spurious errors.

Moreover, in recent years, some automatic test systems for analogical video signals have been also proposed. In particular, said proposed automatic test systems are based on digital acquisition of analogical video signals, for example based on analogical frame grabbing. Moreover, most of said automatic test systems perform quality analyses of digitally-acquired, analogical video signals under test, and/or analyses, direct or indirect, of differences of digitally-acquired, analogical video signals under tests and reference video signals.

In this connection, EP1727376 discloses a real-time video quality measurement instrument. In particular, according to EP1727376, a signature of a digitally-acquired, analogical video signal under test is computed and used, along with a pre-stored signature computed for a reference digitally-acquired, analogical video signal, to spatially and temporally align the video signal under test with the reference video signal. Video quality measurements are then performed on the aligned frames of the digitally-acquired, analogical video signal under test and the digitally-acquired, reference analogical video signal.

Furthermore, US2005071108 discloses a method and an apparatus for automated testing of display signals from video graphics circuitry. In particular, the method according to US2005071108 includes: capturing analogical display signals that are provided from a processing device to a display device; converting the analogical display signals into data acquisition signals (where a data acquisition signal includes a converted display signal having the display information contained therein); and providing the data acquisition signals to a test system that tests the analogical display signals.

Additionally, CN101594551 discloses an image display testing method, which comprises the following steps: connecting an electronic device to be tested and a computer system; sending an instruction of image play to the electronic device to be tested by the computer system; responding to the instruction, executing an image auto-play program, and simultaneously outputting a digital image signal by the electronic device to be tested; acquiring the digital image signal, reducing the digital image signal into an image, and carrying out pixel comparative analysis on the image and a sample image by the computer system; if the comparative analysis result is in an allowable error range, making the image test pass, and ending the test process; while, if the comparative analysis result exceeds the allowable error range, selecting whether to restart the test by repeating the test steps, or to end the test process.

Moreover, JP2118689 discloses an automatic inspecting device for analogical Cathode-Ray Tube (CRT) signals. In particular, according to JP2118689, the analogical CRT signals of one picture are completely input into the automatic inspecting device and signature data of the analogical CRT signals is generated by a signature producing circuit and then fetched into a controller, in which the fetched signature data is compared with previously stored expected data to decide their normal or defective condition. The decided result is output through an interface. Whether the analogical CRT signals are right or wrong is decided with all pictures to be inspected until the reading of a counter reaches the number of picture to be inspected. Thereby, the automatic inspection of the CRT interface which outputs the analogical CRT signals is possible.

Lastly, WO2007022250 discloses display device ON/OFF detection methods and apparatus. In particular, a method according to WO2007022250 for determining whether a presentation device is ON or OFF comprises: determining a plurality of metrics based on monitoring at least one output of the presentation device, wherein each metric in the plurality of metrics comprises a decision indicating an operating state of the presentation device; and combining the plurality of metrics to determine whether the presentation device is ON or OFF, wherein combining the plurality of metrics comprises at least one of weighting the plurality of metrics or determining a majority vote of the plurality of metrics.

OBJECT AND SUMMARY OF THE INVENTION

In view of the increasing complexity and flexibility of digital display systems, and therefore the difficulty in human-operator testing display performance, the Applicant has felt the need to devise a system designed to test digital display systems automatically, i.e. with no human intervention required.

Moreover, the Applicant has noticed that the testing methodologies based on differential analyses implemented by known automatic test systems for digitally-acquired, analogical video signals, such as those ones according to EP1727376 and JP2118689, are too specifically devised for analogical-born video signal testing thereby resulting not particularly advantageous for digital-born video signal testing. Therefore, the Applicant has further felt the need to develop an automatic test system for digital display systems, which automatic test system implements a new methodology specifically devised for digital-born video signal testing.

Thence, it is an object of the present invention to provide an automatic test system implementing a new methodology specifically devised for digital-born video signal testing.

This object is achieved by the present invention in that it relates to an automatic test system for digital display systems, as defined in the appended claims.

In particular, this object is achieved by the present invention in that it relates to an automatic test system for a digital display system, which digital display system comprises:
  display electronics configured to generate a digital video stream; and
  a display screen connected to the display electronics to receive the digital video stream generated thereby, and designed to display at least one image based on the received digital video stream;

The automatic test system according to the present invention is designed to be connected to the digital display system to receive the digital video stream generated by the display electronics, and is configured to:
  reconstruct in memory an image based on the received digital video stream;
  compute a signature of the reconstructed-in-memory image; and
  test the digital display system by comparing the computed signature with a reference signature so as to thereby check whether the reconstructed-in-memory image completely matches an expected display behavior, wherein said reference signature is indicative of said expected display behavior.

BRIEF DESCRIPTION OF THE DRAWINGS

A number of preferred embodiments of the present invention will be described by way of example with reference to the accompanying drawings (not to scale), in which.

PREFERRED EMBODIMENTS OF THE INVENTION

The present invention will be described with reference to the attached drawings to enable anyone skilled in the art to produce and use it. As will be clear to a skilled person, changes may be made to the embodiments described, and the general principles described may be applied to other embodiments and applications without departing from the scope of the present invention as defined in the accompanying claims. The present invention is therefore not to be considered limited to the embodiments described, but shall be accorded the widest protective scope consistent with the principles and characteristics described and claimed herein.

Figure 1:
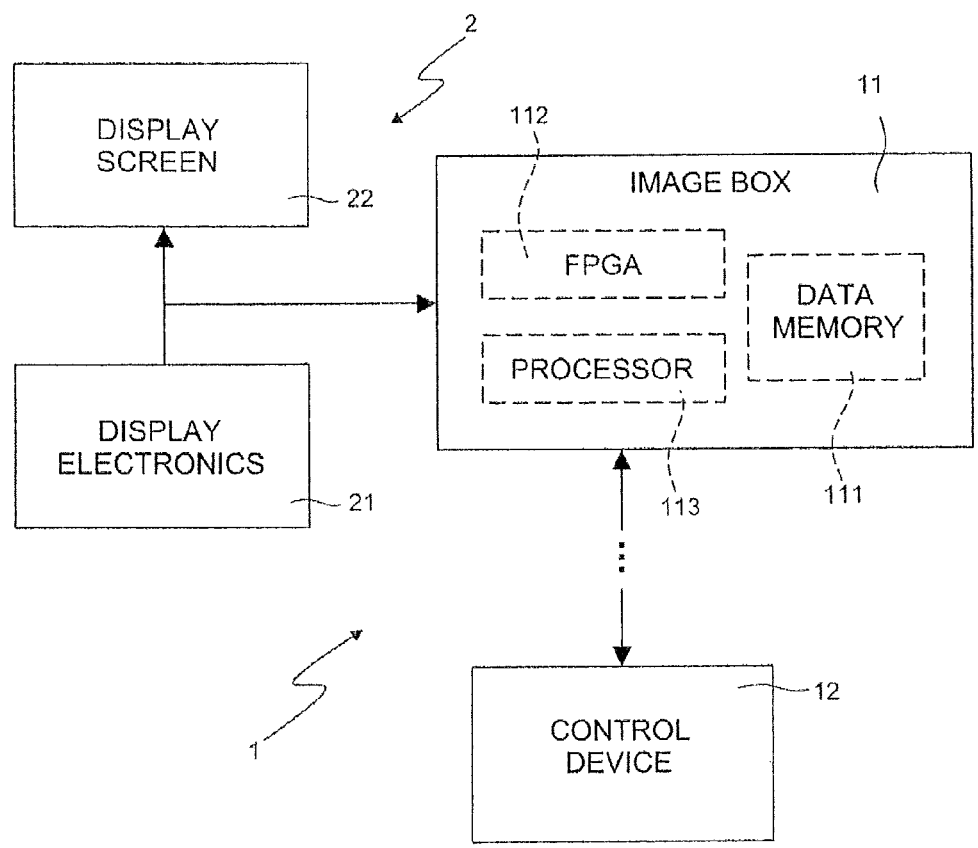
FIG. 1 schematically shows an automatic test system in accordance with a preferred embodiment of the present invention, and a digital display system to be tested.

FIG. 1 shows a block diagram, in which number 1 indicates as a whole an automatic test system in accordance with a preferred embodiment of the present invention, and number 2 indicates as a whole a digital display system to be tested.

As shown in FIG. 1, the digital display system 2 comprises:
  display electronics 21 configured to generate a digital video stream; and
  a display screen 22 connected to display electronics 21 to receive the generated digital video stream therefrom, and to display at least one image based on the received digital video stream.

The automatic test system 1 is designed to be connected to the digital display system 2 to receive the digital video stream from the display electronics 21, and to test the digital display system 2 based on the received digital video stream.

In particular, the automatic test system 1 is designed to:
  reconstruct in memory, based on the received digital video stream, an image corresponding to the entire display screen 22;
  extract from the reconstructed-in-memory image one or more subimages, each corresponding to a respective subarea of the display screen 22;
  compute a signature of the reconstructed-in-memory image;
  compute one or more signatures of one or more extracted sub-images, or, conveniently, compute a signature of each extracted sub-image;
  test the digital display system 2 by comparing at least one computed signature with a respective reference signature; and
  produce a test log indicating, for each comparison, a pass result, when the compared signatures match, or a fail result, when the compared signatures fail to match.

In other words, the automatic test system 1 is designed to reconstruct in memory an image of what would be displayed on the entire display screen 22 based on the received digital video stream; extract from the reconstructed-in-memory image one or more subimages corresponding to the image portion that would be displayed in a corresponding subarea of the display screen 22 based on the digital video stream generated by the display electronics 21; compute a signature of the reconstructed-in-memory image, and a signature of one or more sub-images extracted from the reconstructed-in-memory image, or, conveniently, of each sub-image extracted from the reconstructed-in-memory image; compare at least one computed signature with a respective reference signature (conveniently stored on the automatic test system 1); and output a test log of the comparison results.

The present invention, by reconstructing in memory an image based on the received digital video stream, computing a signature of the reconstructed-in-memory image and testing the digital display system 2 by comparing the signature of the reconstructed-in-memory image with a respective reference signature, implements a testing methodology specifically devised for digital-born video signal testing, which testing methodology allows to check, and, in case, detect, whether the digital video stream generated by the display electronics 21 of the digital display system 2 under test completely matches, i.e., completely corresponds to, a predefined good display behavior (represented by means of the respective reference signature) expected for the image displayed on the entire display screen 22 of the digital display system 2 under test.

Moreover, the present invention, by extracting a subimage from the reconstructed-in-memory image, computing a corresponding signature and testing the digital display system 2 by comparing the signature of the extracted subimage with a respective reference signature, implements a testing methodology specifically devised for digital-born video signal testing, which testing methodology allows to selectively check, and, in case, detect, whether an image portion of interest displayed in a subarea of the display screen 22 based on the digital video stream generated by the display electronics 21 of the digital display system 2 under test completely matches, i.e., completely corresponds to, a predefined good display behavior (represented by means of the respective reference signature) expected for said image portion of interest.

In particular, the present invention allows to selectively check, and, in case, detect, whether an image portion of interest matches or not an expected predefined good display behavior, and, also, to selectively check, and, in case, detect, whether an area surrounding an image portion of interest presents or not unexpected side effects.

On the contrary, the testing systems according to EP1727376 and JP2118689 do not provide said advantageous technical effects since they perform differential analyses only of the whole analogical-born display image with respect to a corresponding expected good display behavior, thereby allowing only to check differences between the whole analogical-born display image and the corresponding expected good display behavior.

In other words, the philosophy underlying the testing methodology implemented by the automatic test system 1 (which is specifically devised for digital-born video signal testing) results to be completely different from the philosophies underlying the testing methodologies implemented by the testing systems according to EP1727376 and JP2118689 (which are specifically devised for analogical-born video signal testing).

In this connection, it is important to underline the fact that the testing system according to EP1727376 uses signatures only to spatially and temporally align a digitally-acquired, analogical video signal under test and a reference digitally-acquired, analogical video signal.

Moreover, it is also important to underline the further fact that the testing system according to JP2118689 uses signatures only to "measure" deviations, i.e., shifts, i.e., differences, between a whole analogical-born display image and a corresponding reference image indicative of an expected good display behavior, because with analogical-born video signals it is not possible to use signatures to check whether a display image is identically equal to a corresponding reference image indicative of an expected good display behavior, due to errors inevitably made in analogical-to-digital acquisition of the analogical-born video signals.

Additionally, the image display testing method according to CN101594551, which is based on a pixel comparative analysis of an acquired image and a sample image, is completely different from the present invention, thereby not allowing to achieve the aforesaid advantageous technical effects thereof.

Furthermore, also the display device ON/OFF detection method according to WO2007022250 and the testing method according to US2005071108 are completely different from the present invention, thereby not allowing to achieve the aforesaid advantageous technical effects thereof.

Specifically, the automatic test system 1 is designed to reconstruct in memory an image corresponding to the entire display screen 22 by storing, on the basis of the received digital video stream, a frame corresponding to the entire display screen 22 in three memory areas according to a predefined digital representation of the color component intensities of the frame pixels, wherein each memory area stores intensity components of the frame pixels in a corresponding color of the Red-Green-Blue (RGB) color model.

In this connection, it is important to underline the fact that none of EP1727376, JP2118689, CN101594551, US2005071108 and WO2007022250 discloses said digital image in-memory-reconstruction performed by the automatic test system 1.

The automatic test system 1 is preferably further designed to:
  compress the reconstructed-in-memory image into a compressed image; and
  compress each extracted subimage into a corresponding compressed subimage.

The test log preferably contains:
  the compressed image, if the computed signature of the reconstructed-in-memory image and the respective reference signature fail to match; and
  the compressed sub-image, if the computed signature of a subimage and the respective reference signature fail to match.

The reconstructed-in-memory image and the subimages extracted therefrom may conveniently be compressed in ZIP or JPEG format.

The signatures of the reconstructed-in-memory image and the subimages extracted therefrom may conveniently be based on a cyclic redundancy check (CRC), for example, of 32 bits (CRC-32).

In this connection, it is important to underline the fact that a CRC-based signature computed on the basis of a digital-born video signal, as performed by the automatic test system 1, is not at all equivalent to a CRC-based signature computed on the basis of a digitally acquired, analogical-born video signal. In fact, the CRC-based signature computed on the basis of a digitally acquired, analogical-born video signal is affected by errors inevitably made in analogical-to-digital acquisition of the analogical-born video signal, thereby not being usable to check whether a display image is identically equal to a corresponding reference image indicative of an expected good display behavior, but being only usable to "measure" deviations, i.e., shifts, i.e., differences, between a digitally acquired, analogical-born display image and a corresponding reference image indicative of an expected good display behavior. In other words, a CRC-based signature computed on the basis of a digital-born video signal, as performed by the automatic test system 1, allows to check, and, in case, detect, whether two display images (namely, an image under test and a reference image) are identically equal or not, while this effect is not achievable by means of a CRC-based signature computed on the basis of a digitally acquired, analogical-born video signal.

With reference again to FIG. 1, the automatic test system 1 preferably comprises:
  an image box 11 connected to the digital display system 2 to receive the digital video stream from the display electronics 21, and comprising an internal data memory 111; and
  a control device 12 connected to the image box 11 to control operation thereof.

More specifically, the control device 12 supplies the image box 11 with a number of commands which, when received and processed, cause the image box 11 to:

reconstruct in data memory 111, based on the received digital video stream, the image corresponding to the entire display screen 22;

extract from the reconstructed-in-memory image the sub-images of subareas of the display screen 22 defined in the commands from the control device 12;

compute the signatures of the reconstructed-in-memory image and the extracted sub-images;

compress the reconstructed-in-memory image and the extracted sub-images; and supply the control device 12 with the computed signatures and the compressed images indicated in the commands from the control device 12.

The control device 12 is configured to receive from the image box 11 the computed signatures and the compressed images indicated in the commands; compare the signatures from the image box 11 with respective reference signatures stored, for example, in the control device 12; and output the test log containing the comparison results and the compressed images from the image box 11 corresponding to the failed results.

The digital video stream generated by the display electronics 21, received by the display screen 22, and acquired by the image box 11 is preferably coded in accordance with the low-voltage differential signaling (LVDS) or digital visual interface (DVI) standard.

The control device 12 is designed to conveniently supply the image box 11 with the following commands:

a SETUP(S,N,M,Q) command, which sets the image box 11 to:
  a digital video standard S, e.g. LVDS or DVI, in which the digital video stream to be acquired is coded, i.e. indicates that the display electronics 21 are configured to generate digital video streams coded to standard S; and
  a resolution (N,M) and quality Q of the full-screen image to be reconstructed in data memory 111, i.e. indicates that the full-screen image is composed of N×M pixels, each of Q-bit coded intensity, i.e. that display screen 22 is configured to display full-screen images composed of N×M pixels of Q-bit coded intensities;

a DEFRECT($id,X_0,Y_0,X_1,Y_1$,CPL) command, which defines a rectangular area id of the display screen 22 extending from a bottom-left pixel ($X_0,Y_0$) to a top-right pixel ($X_1,Y_1$), and defines as the image corresponding to area id the image inside (CPL=INSIDE) or outside (CPL=OUTSIDE) of said area id;

an ARM(list id) command, which defines the list of areas for which signatures are to be computed;

an ACQ command, which causes the image box 11 to:
  reconstruct in the data memory 111, based on the received digital video stream, the full-screen image corresponding to the entire display screen 22 in accordance with the standard S, resolution (N,M) and quality Q parameters specified in the SETUP(S,N,M,Q) command;
  extract from the full-screen reconstructed-in-memory image the images corresponding to the areas defined in the DEFRECT($id,X_0,X_0,X_1,Y_1$,CPL) and ARM(list id) commands;
  compute the signatures of the full-screen reconstructed-in-memory image and of the extracted images; and
  compress the full-screen reconstructed-in-memory image and the extracted images;

a GET(id,crc,image) command which causes the image box 11 to supply the control device 12 with the signature computed for the image corresponding to the area id and/or with the corresponding compressed image.

More specifically, by means, for example, of a user interface of the control device 12 (not shown in FIG. 1 for the sake of illustration simplicity), a user of the automatic test system 1 enters/selects in the control device 12 the standard S, the resolution (N,M) and the quality Q parameters of the digital display system 2 to be tested, and a set of test parameters relative to the type of test to perform, and then starts the test. When the test starts, the control device 12 sends the image box 11:

the SETUP(S,N,M,Q) command, which sets the image box 11 to the entered/selected standard S, resolution (N,M) and quality Q parameters;

a first DEFRECT(A,M,1,1,N,INSIDE) command, which defines a first area A corresponding to the entire display screen 22 of the digital display system 2;

a set of second DEFRECT ($id,X_0,Y_0,X_1,Y_1$,CPL) commands, which define a set of second areas corresponding to subareas of the display screen 22 in accordance with the entered/selected test parameters;

an ARM(list id) command defining the list of areas for which signatures are to be computed according to the entered/selected test parameters, and which conveniently contains the first area A;

an ACQ command which causes the image box 11 to:
  reconstruct in data memory 111, based on the digital video stream received from the digital display system 2, the full-screen image corresponding to the first area A;
  extract from the in-memory reconstructed full-screen image the images corresponding to the second areas defined in the second DEFRECT($id,X_0,Y_0,X_1,Y_1$, CPL) commands and listed in the ARM(list id) command;
  compute the signatures of the in-memory reconstructed full-screen image and of the extracted images; and
  compress the in-memory reconstructed full-screen image and the extracted images;

a first GET(A,crc,image) which causes the image box to supply the control device 12 with the signature computed for the in-memory reconstructed full-screen image corresponding to the first area A, and/or with the corresponding compressed full-screen image; and a set of second GET(id,crc,image) commands which cause the image box 11 to supply the control device 12 with the signatures computed for the images of the second areas id indicated in the second GET(id,crc,image) commands and/or with the corresponding compressed images, according to the entered/selected test parameters.

Figure 2:
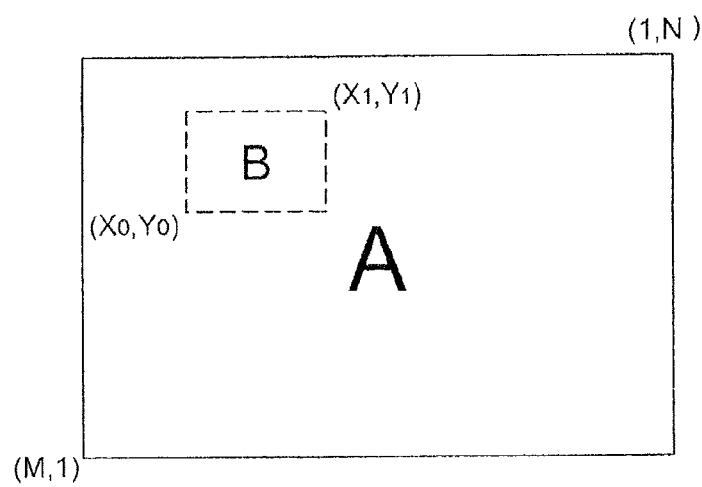
FIG. 2 schematically shows a display screen area of the digital display system shown in FIG. 1, and a respective subarea, both defined for testing purposes by the automatic test system shown in FIG. 1.

FIG. 2 schematically shows, purely by way of example, the first area A defined in the first DEFRECT(A,M,1,1,N,INSIDE) command, and a second area B defined in a second DEFRECT(B,$X_0,X_0,X_1,Y_1$,INSIDE) command.

The display electronics 21 preferably outputs the digital video stream at a digital video output (not shown in FIG. 1 for the sake of illustration simplicity), to which the display screen 22 and the image box 11 are each connected by a respective digital video input (not shown in FIG. 1 for the sake of illustration simplicity). More specifically, the digital video output of the display electronics 21 and the digital video inputs of the display screen 22 and of the image box 11 may conveniently be LVDS or DVI standard interfaces.

The image box 11 and the control device 12 are preferably mutually connected by a high-speed interface, e.g. an Ethernet or high-speed-standard RS232/422 interface.

The image box 11 may conveniently be arranged close to the digital display system 2, and the control device 12 may conveniently be arranged remotely from the image box 11 and the digital display system 2, and so connected remotely to the image box 11. Being arranged close to the digital display system 2, the image box 11 can be connected to the digital display system 2 by a digital video wire short enough not to adversely affect acquisition of the digital video stream by the image box 11.

As shown in FIG. 1, the image box 11 preferably comprises a field programmable gate array (FPGA) 112 and a processor 113, or a field programmable gate array (FPGA) with an embedded processor (not shown in FIG. 1).

The control device 12 may conveniently comprise:
 a laptop programmed to operate as described above; or
 an existing test bench modified to operate as described above; or
 a new test bench designed to operate as described above.

The display electronics 21 may conveniently comprise one or more inputs, to which the control device 12 can be connected to command the display electronics 21 to simulate predetermined operating modes, i.e. to generate predetermined digital video streams, necessary to test the digital display system 2.

The present invention has numerous advantages. In particular, the automatic test system according to the invention provides for testing digital display systems automatically, i.e. with no human operator assistance to test display performance of the systems, which means reliable test results for critical digital display systems, such as those used on aircraft, trains, motor vehicles, nuclear plants, biomedical equipment, etc., no longer depend on human operator care and attention.

Moreover, existing test benches, which were formerly provided only for automatically testing digital display system input/output lines, can now be modified to also fully automate digital display system display performance testing.

Finally, the automatic test system according to the present invention is designed to implement a testing methodology specific for digital-born video signal.

The invention claimed is:

1. An automatic test system (1) for a digital display system (2), which digital display system (2) comprises:
 display electronics (21) configured to generate a digital-born video stream ("digital video stream"); and
 a display screen (22) connected to the display electronics (21) to receive the digital video stream generated thereby, and designed to display at least one image based on the received digital video stream;
the automatic test system (1) being designed to be connected to the digital display system (2) to receive the digital video stream generated by the display electronics (21), and being configured to:
 reconstruct in memory an image based on the received digital video stream, wherein the image reconstructed in memory, based on the received digital video stream, corresponds to the entire display screen (22);
 compute a signature of the reconstructed-in-memory image, wherein the signature is computed from the reconstructed-in-memory image based on a cyclic redundancy check (CRC);
 test the digital display system (2) by comparing the computed signature with a reference signature so as to thereby check whether the computed signature completely matches a reference signature so as to determine whether the reconstructed-in-memory image completely matches an expected display behavior, wherein said reference signature is indicative of said expected display behavior;
 extract from the reconstructed-in-memory image one or more sub-images, each corresponding to a respective subarea of the display screen (22);
 compute a signature of at least one extracted sub-image based on CRC;
 test the digital display system (2) by comparing the computed signature of the at least one extracted sub-image with a respective reference signature to check whether the signatures completely match so as to thereby check whether the image for which said signature has been computed completely matches a respective expected display behavior, wherein said respective reference signature is indicative of said respective expected display behavior;
 compress the reconstructed-in-memory image and each extracted sub-image; and
 generate a test log indicating, for each performed comparison, a pass result if the compared signatures match, and a fail result if the compared signatures fail to match, wherein the test log contains:
 the compressed reconstructed-in-memory image, if the computed signature of the reconstructed-in-memory image and the respective reference signature fail to match; and
 a compressed sub-image, if the computed signature of the sub-image and the respective reference signature fail to match.

2. The automatic test system of claim 1, configured to compute a signature of each extracted sub-image.

3. The automatic test system according to claim 1, configured to reconstruct in memory an image corresponding to the entire display screen (22) by storing, on the basis of the received digital video stream, a frame corresponding to the entire display screen (22) in three memory areas according to a predefined digital representation of the color component intensities of the frame pixels, wherein each memory area stores intensity components of the frame pixels in a corresponding color of the Red-Green-Blue (RGB) color model.

4. The automatic test system of claim 1, further comprising:
 an image box (11) designed to be connected to the digital display system (2) to receive the digital video stream generated by the display electronics (21); and
 a control device (12) connected to the image box (11) to supply the image box (11) with a set of commands which, when received and process, cause the image box (11) to:
 reconstruct in an internal memory (111), based on the received digital video stream, an image corresponding to the entire display screen (22);
 extract subimages corresponding to specific subareas of the display screen (22) from the reconstructed-in-memory image;
 compute signatures of the reconstructed-in-memory image and of the extracted sub-images;
 compress the reconstructed-in-memory image and the extracted sub-images thereby generating compressed images; and
 supply the control device (12) with specific computed signatures and specific compressed images;

and wherein the control device (12) is configured to compare the specific signatures received from the image box (11) with respective reference signatures, and to produce the test log.

5. The automatic test system of claim 4, wherein the commands include:
a first command which sets a digital video standard based on which the digital video stream generated by the display electronics (21) is coded, and a resolution and a quality of the image corresponding to the entire display screen (22) to be reconstructed by the image box (11) in the internal memory (111);
a second command defining an area of the display screen (22);
a third command defining a list of areas for which signatures are to be computed by the image box (11);
a fourth command which causes the image box (11) to:
reconstruct in the internal memory (111) the image corresponding to the entire display screen (22) based on the received digital video stream, and on the digital video standard, resolution, and quality set in the first command received by the image box (11);
extract, from the full-screen image reconstructed in the internal memory (111), the images corresponding to the areas defined in the second and third commands received by the image box (11);
compute the signatures of the full-screen image reconstructed in the internal memory (111) and of the images extracted therefrom; and
compress the full-screen image reconstructed in the internal memory (111) and the images extracted therefrom; and
a fifth command which causes the image box (11) to supply the control device (12) with the computed signature of the image corresponding to a specific area and/or the corresponding compressed image.

6. A software program product comprising software and/or firmware code portions which are:
stored on a non-transitory computer-readable medium;
loadable into a memory of an automatic test system (1) connectable to a digital display system (2) to receive a digital video stream generated thereby;
executable by a processor (113) of said automatic test system (1); and
such that to cause, when executed, said automatic test system (1) to become configured as claimed in claim 1.

7. An automatic test system (1) for a digital display system (2), which digital display system (2) comprises
display electronics (21) configured to generate a predetermined digital-born video stream ("digital video stream"), wherein the digital video stream is not a digitally acquired, analogical-born video signal, and
a display screen (22) connected to the display electronics (21) to receive the digital video stream generated thereby, and designed to display at least one image based on the received digital video stream, comprising:
the automatic test system (1) being designed to be connected to the digital display system (2) to receive the digital video stream generated by the display electronics (21), and being configured to:
reconstruct in memory an image corresponding to the entire display screen (22) based on the received digital video stream;
compute, based on a cyclic redundancy check (CRC), a signature for the entire image corresponding to the entire display screen, wherein the signature is computed from the reconstructed-in-memory image;
extract from the reconstructed-in-memory image one or more sub-images, each corresponding to a respective subarea of the display screen (22);
compute a respective signature of at least one extracted sub-image based on CRC; and
test the digital display system (2) by:
testing the computed signature and the computed respective signature against respective reference signatures for a complete match, wherein said reference signatures are indicative of an expected display behavior; and
determining, based on the complete match, that the reconstructed in memory image completely matches the expected display behavior;
wherein the one or more sub-images comprise one or more of: a first sub-image that corresponds to an area A within the image corresponding to the entire display screen, and a second sub-image that corresponds to an area B within the image, wherein the area B is an area that surrounds the area A and excludes the area A; and
wherein the automatic test system (1) is further configured to:
selectively test the digital display system (2) by:
testing a computed respective signature of the first sub-image against a respective reference signature for a complete match, wherein said respective reference signature is indicative of an expected display behavior of area A;
determining, based on the complete match of the computed respective signature of the first sub-image against its respective reference signature, that the first sub-image complete matches the expected display behavior of area A;
testing a computed respective signature of the second sub-image against a respective reference signature for a complete match, wherein said respective reference nature is indicative of an expected display behavior of area B; and
determining, based on the complete match of the computed respective signature of the second sub-image against its respective reference signature, whether the second sub-image complete matches the expected display behavior of area B, wherein an incomplete match represents unexpected side effects within area B.

8. The automatic test system of claim 7, wherein the CRC is 32-bit CRC.

9. The automatic test system of claim 7, wherein the first sub-image corresponding to area A is excluded from testing.

10. An automatic test system for testing a digital display system having display electronics configured to generate a predetermined digital-born video stream ("digital video stream") and a display screen connected to the display electronics to receive the digital video stream generated thereby, comprising:
the automatic test system being designed to display at least one image based on the received digital video stream, and being designed to be connected to the digital display system (2) to receive the digital video stream, and being configured to:
reconstruct in memory an image based on the received digital video stream, wherein the image reconstructed in memory corresponds to the entire display screen;
compute a first signature of the reconstructed-in-memory image, wherein the signature is computed from the reconstructed-in-memory image based on a cyclic redundancy check (CRC);

extract from the reconstructed-in-memory image one or more sub-images, each corresponding to a respective subarea of the display screen (22);

compute a respective signature of at least one extracted sub-image based on CRC;

test the digital display system by:
  comparing the first signature with a first reference signature so as to thereby check for a complete match and thereby determine whether the entire reconstructed-in-memory image completely matches an expected display behavior, wherein said first reference signature is indicative of said expected display behavior, and
  comparing the respective signature of the at least one extracted sub-image with a respective reference signature to check for a complete match and thereby whether the respective sub-image for which said respective signature has been computed completely matches an expected display behavior of the respective subarea, wherein said respective reference signature is indicative of said respective expected display behavior of the respective sub-area, compress the reconstructed-in-memory image and each extracted sub-image; and generate a test log indicating, for each performed comparison, a pass result if the compared signatures match, and a fail result if the compared signatures fail to match, and wherein the test log contains:
  the compressed reconstructed-in-memory image, if the computed signature of the reconstructed-in-memory image and the respective reference signature fail to match, and
  a compressed sub-image, if the respective signature of the at least one sub-image and the respective reference signature fail to match.

* * * * *